US010989313B2

(12) United States Patent
Nagamori

(10) Patent No.: US 10,989,313 B2
(45) Date of Patent: Apr. 27, 2021

(54) VALVE DEVICE

(71) Applicant: Waterworks Technology Development Organization Co., Ltd., Osaka (JP)

(72) Inventor: Yasuyuki Nagamori, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 10 days.

(21) Appl. No.: 16/279,296

(22) Filed: Feb. 19, 2019

(65) Prior Publication Data

US 2019/0257433 A1 Aug. 22, 2019

(30) Foreign Application Priority Data

Feb. 19, 2018 (JP) ................................ 2018-026818

(51) Int. Cl.
*F16K 5/04* (2006.01)
*F16K 11/076* (2006.01)
*F16K 37/00* (2006.01)

(52) U.S. Cl.
CPC .......... *F16K 5/0492* (2013.01); *F16K 5/0407* (2013.01); *F16K 11/076* (2013.01); *F16K 37/0066* (2013.01); *Y10T 137/7668* (2015.04)

(58) Field of Classification Search
USPC ............................................... 137/312, 454.6
See application file for complete search history.

(56) References Cited

U.S. PATENT DOCUMENTS 3,648,723 A * 3/1972 Nelson .................. F16K 5/0689 137/454.6
4,605,036 A * 8/1986 Smith .................. F16K 5/0435 137/327
4,749,002 A * 6/1988 Lembser .................. F16K 5/20 137/246.22

FOREIGN PATENT DOCUMENTS

JP H01-116276 U 8/1989
JP 2006-194344 A 7/2006
JP 2016-173133 A 9/2016

OTHER PUBLICATIONS

Extended European Search Report for Application No. 18207550.7, dated Jun. 3, 2019 in 9 pages.

(Continued)

*Primary Examiner* — John Fox
(74) *Attorney, Agent, or Firm* — Knobbe, Martens, Olson & Bear, LLP

(57) ABSTRACT

A valve device has an outer valve casing externally fitted to an existing fluid pipe, an inner valve casing housed in the outer valve casing and an inner packing for sealing a gap between them. The inner packing includes an annular portion mounted along a periphery of an upper side surface of the inner valve casing and a plurality of U-shaped portions extending downward from the annular portion and to be mounted over an entire length from a side surface to a bottom surface of the inner valve casing. An enclosed space sandwiched between an inner surface of the outer valve casing and an outer surface of the inner valve casing is formed between the U-shaped portions that are adjacent to each other. The inner packing is provided with a connecting portion for connecting the plurality of U-shaped portions to one another.

8 Claims, 9 Drawing Sheets

(56) References Cited

OTHER PUBLICATIONS

Chinese Office Action for Application No. 201910015691.5, dated Mar. 17, 2020 in 15 pages. (English Translation Included).
Chinese Office Action for Chinese Patent Application No. 201910015691.5, dated Jan. 25, 2021 in 13 pages including English translation.

* cited by examiner (a)

(b)

(c)

VALVE DEVICE

BACKGROUND OF THE INVENTION

Field of the Invention

The present invention relates to a valve device including an outer valve casing attached to an existing fluid pipe and an inner valve casing housed in the outer valve casing.

Description of the Related Art

Patent Document 1 discloses a valve device including an outer valve casing attached to an existing fluid pipe and an inner valve casing housed in the outer valve casing. The inner valve casing has a valve body capable of shutting off a flow path of a fluid flowing in the fluid pipe. This valve device also includes a packing (outer packing) for sealing a gap between split portions of the outer valve casing and a packing (inner packing) for sealing a gap between the outer valve casing and the inner valve casing housed therein. Regarding this kind of valve device, Patent Document 2 filed by the present applicant proposes a technique for easily checking sealing performance between the outer valve casing and the inner valve casing.

FIG. 10 shows an inner packing 9 which is one of packings included in the valve device disclosed in Patent Document 2 and which seals a gap between the outer valve casing (not shown) and the inner valve casing (not shown). The inner packing 9 includes an annular portion 91 mounted along the periphery of an upper side surface of the inner valve casing and a pair of U-shaped portions 92 extending downward from the annular portion 91 and to be mounted over the entire length from the side surface to the bottom surface of the inner valve casing. An enclosed space 90 represented by the gray color in the drawing is formed between the pair of U-shaped portions 92. According to such a configuration, the sealing performance can be easily checked based on whether or not a fluid is continuously discharged when a communication port for allowing the enclosed space 90 to communicate with the outside or a drain is opened.

However, it has been found that, when the inner valve casing with the inner packing 9 mounted thereto is housed in the outer valve casing, the inner valve casing moves downward with the inner packing 9 being in contact with the inner surface of the outer valve casing, and the inner packing 9 may be detached from the inner valve casing due to the contact resistance. In particular, as indicated by an arrow X in FIG. 10, the inner packing 9 is likely to be easily detached from the bottom surface of the inner valve casing. When the inner packing 9 is detached from the inner valve casing, sealing performance between the outer valve casing and the inner valve casing cannot be ensured, which is a problem.

PRIOR ART DOCUMENT

Patent Document

Patent Document 1: JP-A-2006-194344
Patent Document 2: JP-A-2016-173133

SUMMARY OF THE INVENTION

The present invention has been made in view of the above circumstances, and an object thereof is to prevent detachment of an inner packing attached to an inner valve casing which is to be housed in an outer valve casing.

The present invention provides a valve device comprising an outer valve casing externally fitted to an existing fluid pipe, an inner valve casing housed in the outer valve casing and having a valve body capable of shutting off or switching a flow path of a fluid flowing in the existing fluid pipe, and an inner packing for sealing a gap between the outer valve casing and the inner valve casing, wherein the inner packing includes an annular portion mounted along a periphery of an upper side surface of the inner valve casing and a plurality of U-shaped portions extending downward from the annular portion and to be mounted over an entire length from a side surface to a bottom surface of the inner valve casing, an enclosed space sandwiched between an inner surface of the outer valve casing and an outer surface of the inner valve casing is formed between the U-shaped portions that are adjacent to each other, and the inner packing is provided with a connecting portion for connecting the plurality of U-shaped portions to one another. Thus, detachment of the inner packing attached to the inner valve casing which is to be housed in the outer valve casing can be prevented.

It is preferable that the connecting portion is disposed on a bottom surface side of the inner valve casing. Accordingly, the detachment of the inner packing from the bottom surface of the inner valve casing can be effectively prevented. Further, when each of the U-shaped portions includes an arcuate part and a pair of linear parts extending from both ends of the arcuate part toward the side surface of the inner valve casing as viewed from a bottom surface side of the inner valve casing, and the connecting portion is provided along a direction of extension of the arcuate part or along a direction of extension of the linear parts, the connecting portion is provided in a direction in which tension acts on the inner packing, whereby the U-shaped portions can be firmly connected to one another.

It is preferable that the connecting portion is formed to be thinner than the U-shaped portions. The configuration described above can make it easy to prevent the enclosed space from unnecessarily being interrupted by the connecting portion.

DETAILED DESCRIPTION OF THE PREFERRED EMBODIMENTS

An embodiment of the present invention will be explained with reference to the drawings.

[Configuration of Valve Device]

Figure 1:
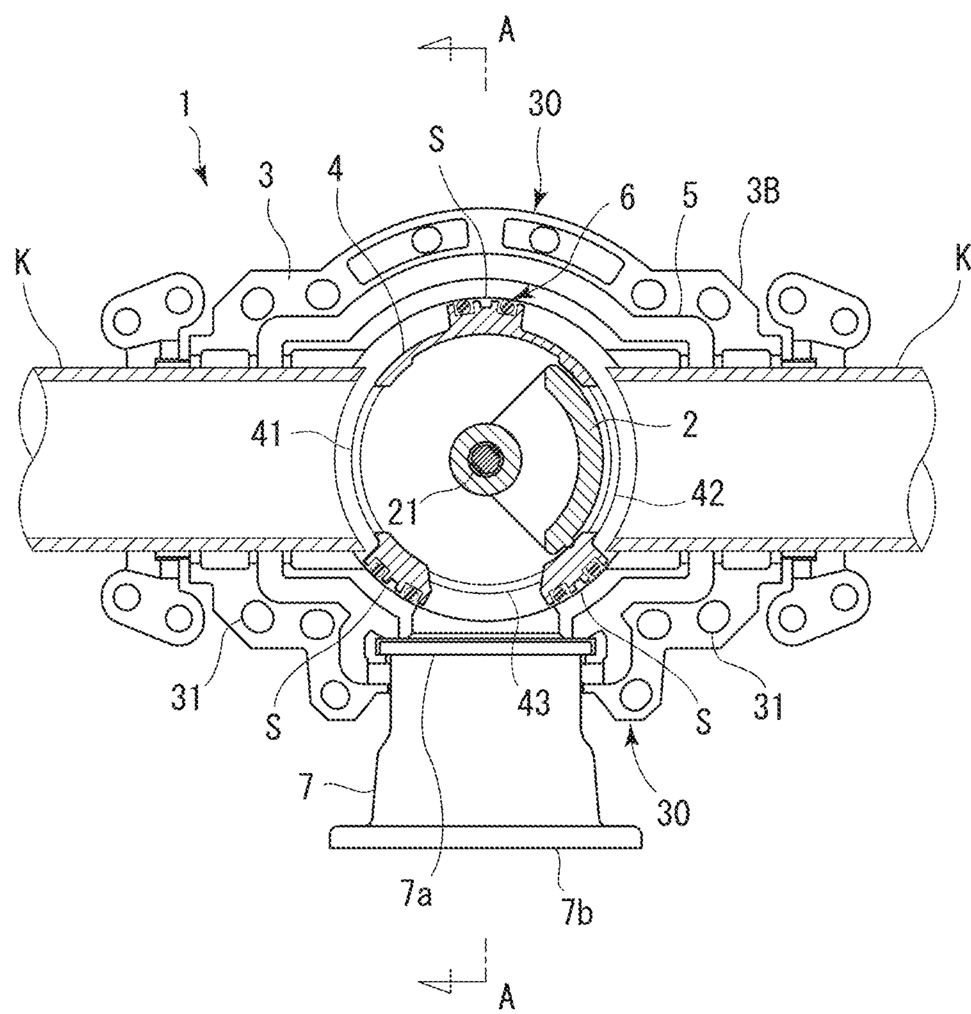
FIG. 1 is a transverse sectional view showing an example of a valve device according to the present invention.
Figure 2:
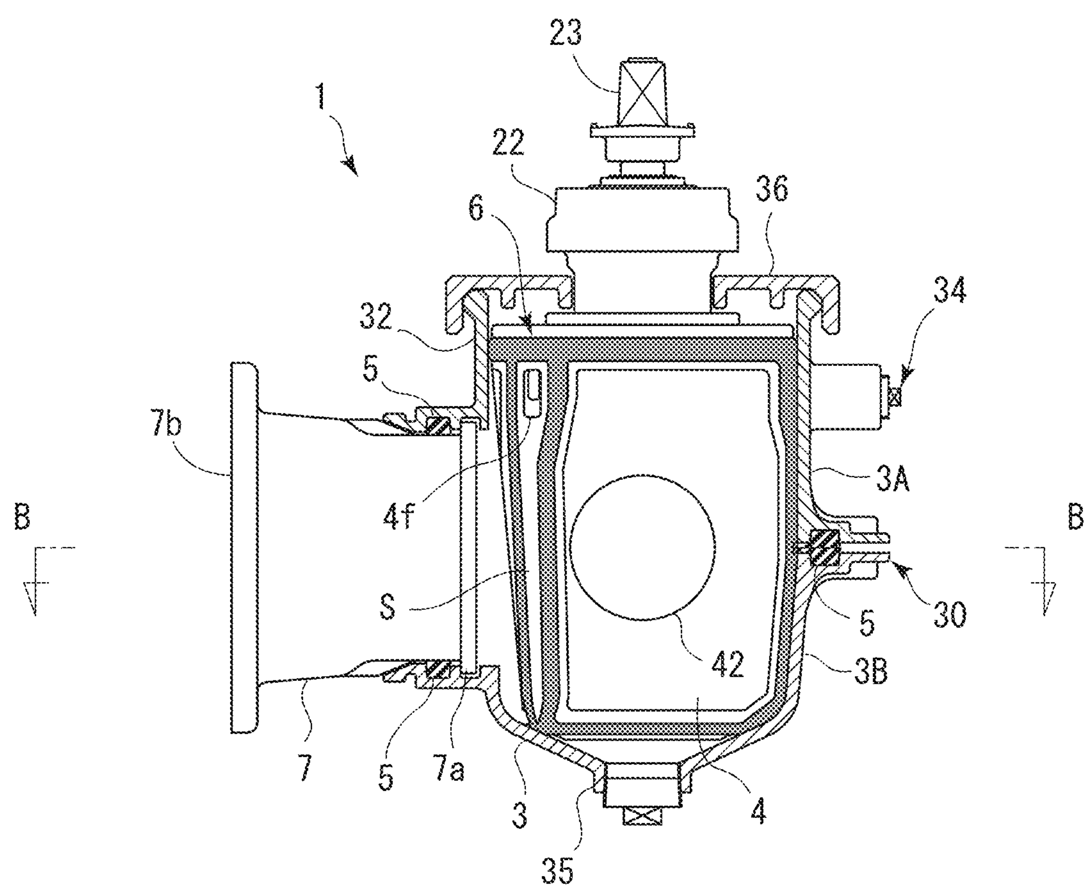
FIG. 2 is a longitudinal sectional view of the valve device.

As shown in FIGS. 1 and 2, a valve device 1 includes an outer valve casing 3 externally fitted to an existing water pipe K (an example of a fluid pipe), an inner valve casing 4 housed in the outer valve casing 3, and an inner packing 6 for sealing a gap between the outer valve casing 3 and the inner valve casing 4. In FIG. 2 (and FIGS. 4, 5, 8 and 9), the inner packing 6 shown in appearance is colored so as to be easily identified in the drawings. The inner valve casing 4 has a valve body 2 capable of shutting off or switching a flow path of a fluid (that is, water) flowing in the water pipe K. The outer valve casing 3 has a split structure, and a gap between split portions 30 is sealed by outer packings 5 and 5. In the present embodiment, the split portions 30 and 30 are set at two locations in the circumferential direction of the water pipe K, and they are positioned in the horizontal direction.

The outer valve casing 3 surrounds the outer peripheral surface of the water pipe K in a predetermined portion in a sealed state. The outer valve casing 3 is vertically split into two, an upper half member 3A and a lower half member 3B. The outer packings 5 are attached to the upper half member 3A and the lower half member 3B, respectively. The outer packings 5 are formed separately from the inner packing 6. FIG. 1 is a transverse sectional view of the valve device 1 cut along the split portions 30, that is, along a joint between the upper half member 3A and the lower half member 3B, and corresponds to a cross section along line B-B in FIG. 2. FIG. 2 corresponds to a cross section along line A-A in FIG. 1, wherein the inner valve casing 4 is shown as viewed from the side. The upper half member 3A and the lower half member 3B are joined to each other by a fixing tool (not shown) including bolts inserted into bolt holes 31 and nuts screwed to the bolts.

The upper half member 3A has an opening 32 through which the inner valve casing 4 and the like can be inserted and removed. In FIG. 2, a lid 36 is connected to the outer valve casing 3 so as to cover the opening 32. In the present embodiment, a branch piping 7 is connected to the outer valve casing 3. The branch piping 7 is shown in appearance rather than in cross-section. The branch piping 7 has an end 7*a* on one side connected to the outer valve casing 3 and an end 7*b* on the other side connected to a branch pipe or a plug (not shown). The end 7*a* is connected to the outer valve casing 3 while being held between the split portions 30. However, the present invention is not limited thereto. The end 7*b* is formed as a socket, but it is not limited thereto. A gap between the inner surface of the outer valve casing 3 and the outer surface of the branch piping 7 is sealed by outer packings 5 and 5.

The inner valve casing 4 is constituted by a substantially cylindrical case having an axis along the vertical direction. Like the outer valve casing 3, the inner valve casing 4 is made of a metal material. The inner valve casing 4 in FIG. 2 is shown in appearance. A pair of through holes 41 and 42 provided along the axial direction of the water pipe K and a through hole 43 provided along the axial direction of the branch piping 7 are formed in the side surface of the inner valve casing 4. The valve body 2 is configured to be rotatable in accordance with the operation of a valve shaft 21. The flow path can be shut off or switched by selectively closing the through holes 41 to 43 by the valve body 2. A speed reducer 22 having an operating portion 23 connected to the valve shaft 21 is placed above the inner valve casing 4.

Figure 3:
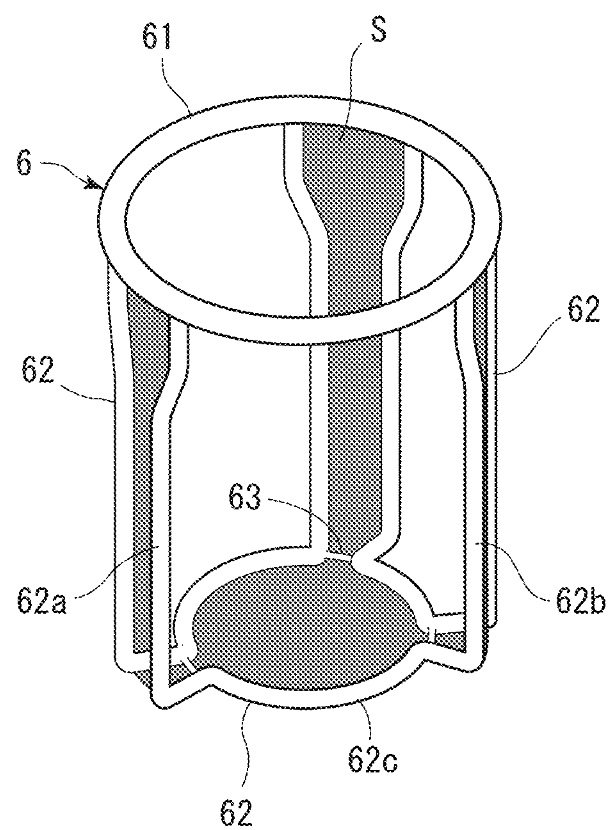
FIG. 3 is a perspective view of an inner packing.
Figure 4:
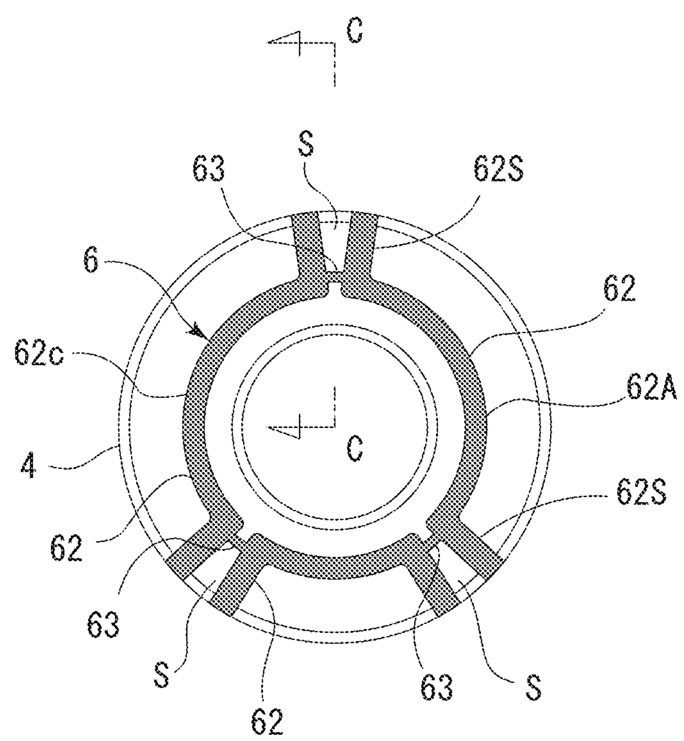
FIG. 4 is a bottom view of an inner valve casing.

The inner packing 6 is attached to the outer surface of the inner valve casing 4. Like the outer packing 5, the inner packing 6 is formed of an elastic material such as rubber. As shown in FIGS. 1 and 2, the inner valve casing 4 abuts against the inner surface of the outer valve casing 3 via the inner packing 6. As shown in FIGS. 3 and 4, the inner packing 6 has an annular portion 61 mounted along the periphery of the upper side surface of the inner valve casing 4 and a plurality of U-shaped portions 62 extending downward from the annular portion 61 and to be mounted over the entire length from the side surface to the bottom surface of the inner valve casing 4. The present embodiment shows an example in which the inner packing 6 has three U-shaped portions 62. The U-shaped portions 62 are arranged so as to surround the through holes 41 to 43, respectively.

The annular portion 61 seals a gap between the inner surface of the outer valve casing 3 and the outer surface of the inner valve casing 4 at the opening 32. The U-shaped portions 62 seal a gap between the inner surface of the outer valve casing 3 and the outer surface of the inner valve casing 4 around the through holes 41 to 43. An enclosed space S sandwiched between the inner surface of the outer valve casing 3 and the outer surface of the inner valve casing 4 is formed between the adjacent U-shaped portions 62. In FIG. 3, the enclosed space S is colored so as to be easily identified in the drawing. The enclosed space S extends in the vertical direction at three positions on the side surface of the inner valve casing 4 and these enclosed spaces S communicate with one another on the bottom surface side of the inner valve casing 4. If the sealing performance (that is, the water blocking performance) between the outer valve casing 3 and the inner valve casing 4 is appropriately exhibited, water in the water pipe K does not enter the enclosed spaces S.

The inner packing 6 is fitted in a groove 44 (see FIG. 5) formed in the outer surface of the inner valve casing 4. When the inner valve casing 4 moves downward with the inner packing 6 being in contact with the inner surface of the outer valve casing 3 during the assembly of the valve device 1 described later, the inner packing 6 may be detached from (the groove 44 of) the inner valve casing 4. In view of this, in the valve device 1, the inner packing 6 is provided with a connecting portion 63 that connects the plurality of U-shaped portions 62 to each other to prevent the inner packing 6 from being detached. The detachment of the inner packing 6 is likely to occur at the bottom surface of the inner valve casing 4, and therefore, the connecting portion 63 is preferably arranged at least on the bottom surface side of the inner valve casing 4. With this configuration, even if the inner valve casing 4 is inserted while the inner packing 6 rubs the inner surface of the outer valve casing 3 in a compressed state, the detachment of the inner packing 6 at the bottom surface of the inner valve casing 4 can be effectively prevented.

As shown in FIG. 3, each of the U-shaped portions 62 includes a pair of lateral parts 62*a* and 62*b* extending in the vertical direction and to be mounted on the side surface of the inner valve casing 4 and a lower part 62*c* that connects the lower ends of the pair of lateral parts 62*a* and 62*b* and that is to be mounted on the bottom surface of the inner valve casing 4. Each of the U-shaped portions 62 also has an arcuate part 62A and a pair of linear parts 62S and 62S extending from both ends of the arcuate part 62A toward the side surface of the inner valve casing 4, when viewed from the bottom surface side of the inner valve casing 4, as shown in FIG. 4. According to this configuration, the U-shaped portions 62 (the lower parts 62*c* of the U-shaped portions 62) are easily brought into close contact with the inner surface of the bottom of the outer valve casing 3 formed into a cone shape. The arcuate parts 62A are formed in an arc shape along the circumferential direction of the annular portion 61. The linear parts 62S bend and extend from the ends of the arcuate parts 62A.

The connecting portion 63 is provided along the direction of extension of the arcuate parts 62A. As a result, the connecting portion 63 is provided to extend in the direction in which the tension acts on the inner packing 6, so that the U-shaped portions 62 can be firmly connected to one another. Alternatively or additionally, it is also possible to provide the connecting portion 63 along the direction of extension of the linear parts 62S as in another embodiment described later. Further, the detachment of the inner packing 6 is liable to occur at the bent portions of the inner packing 6, and thus, it is preferable to provide the connecting portion 63 at the bent portions of the inner packing 6 as shown in FIG. 4 from the viewpoint of improving the effect of preventing the detachment of the inner packing 6.

Figure 5:
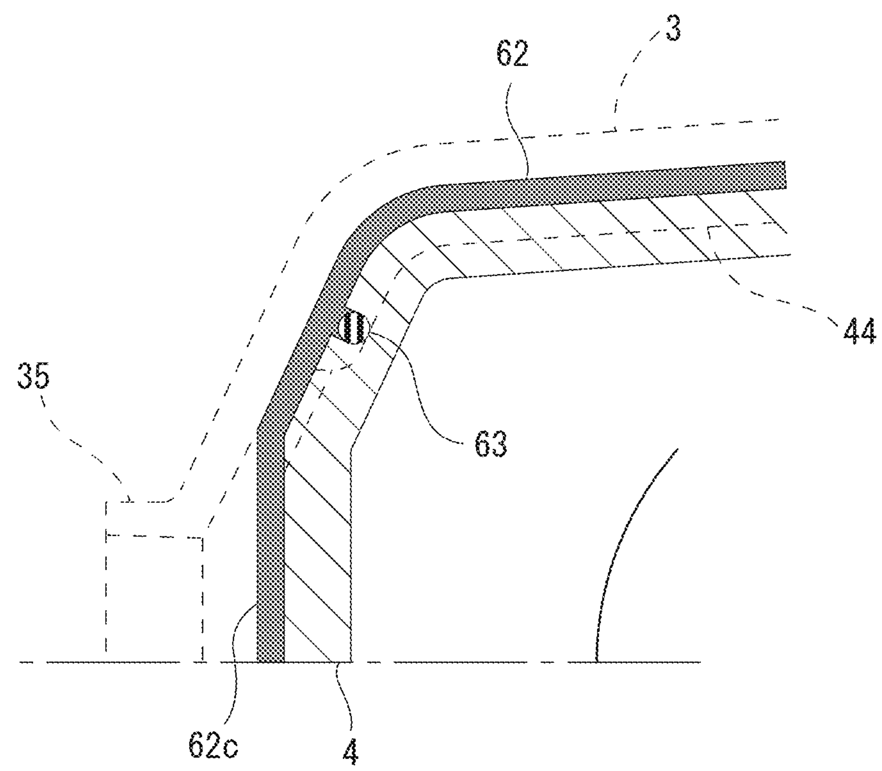
FIG. 5 is a sectional view taken along line C-C in FIG. 4.

As shown in FIGS. 3 to 5, in the present embodiment, the connecting portion 63 is formed to be thinner than (the lower parts 62*c* of) the U-shaped portions 62 so that the enclosed space S is not interrupted by the connecting portion 63. Therefore, in the enclosed space S, the state of communication where the space extending in the vertical direction along the side surface of the inner valve casing 4 and the space on the bottom surface side of the inner valve casing 4 are communicated with each other is ensured. In the example of FIG. 5, since the connecting portion 63 is fitted into the groove 44 formed in the outer surface of the inner valve casing 4, such state of communication is reliably maintained. Meanwhile, it is also possible to dispose the connecting portion 63 in the gap between the inner surface of the outer valve casing 3 and the outer surface of the inner valve casing 4, and even in that case, the connecting portion 63 is formed to be sufficiently thin (that is, formed to have a small cross-sectional area) so as not to interrupt the enclosed space S.

Figure 6:
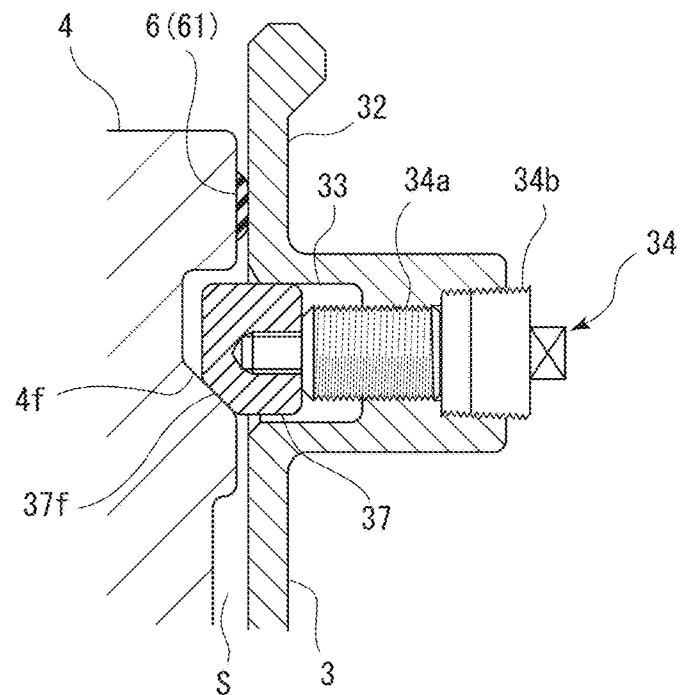
FIG. 6 is a sectional view of a main part of the valve device.

As shown in FIG. 6, the outer valve casing 3 has a communication port 33 for allowing communication between the enclosed space S and the outside and an opening/closing member 34 for opening and closing the communication port 33. In FIG. 2, they are shown in appearance rather than in cross-section. In the present embodiment, the communication port 33 is formed into a tubular shape, and the opening/closing member 34 is constituted by a set screw 34*a* and a plug 34*b*. However, the present invention is not limited thereto. For example, it is also possible to construct the opening/closing member with a bolt as disclosed in Patent Document 2 filed by the present applicant. Further, in the present embodiment, a fixing unit for fixing the inner valve casing 4 to the outer valve casing 3 is incorporated in the communication port 33, which will be described later.

As described above, if the sealing performance between the outer valve casing 3 and the inner valve casing 4 is appropriately exhibited, water in the water pipe K does not enter the enclosed space S. Therefore, if water is not continuously discharged from the drain 35 of the outer valve casing 3 or a drain of an insertion device 83 described later upon assembling the valve device 1 without interrupting water supply, a worker can check that the sealing performance is appropriately exhibited between the outer valve casing 3 and the inner valve casing 4. If not, water enters into the enclosed space S, and therefore, the worker can check that the sealing performance is not appropriately exhibited. Since the connecting portion 63 does not interrupt the enclosed space S as described above, it does not affect the work for checking the sealing performance.

[Fixing Unit for Inner Valve Casing]

The fixing unit for fixing the inner valve casing 4 to the outer valve casing 3 will be described. However, the present invention is not limited to the configuration described below. For example, a bolt disclosed in Patent Document 2 filed by the present applicant can also be used to fix the inner valve casing 4 to the outer valve casing 3. A bolt with a sharp tip may be used as such a bolt. In addition, the fixing unit does not necessarily use the enclosed space S. It may have a structure for fixing the inner valve casing 4 by engaging a predetermined member with the upper surface of the inner valve casing 4.

In the present embodiment, the outer valve casing 3 has the tubular communication port 33 for allowing the enclosed space S to communicate with the outside and a piece 37 incorporated in the communication port 33, as shown in FIG. 6. The piece 37 is formed of a rigid body such as a metal. For example, it is made of iron. The piece 37 is displaceable between a protruding position (see FIG. 6) where the piece 37 protrudes to the inside of the enclosed space S and a housed position (see FIG. 7) where the piece 37 is housed in the communication port 33 so as not to protrude to the inside of enclosed space S, according to an operation from the outside through the communication port 33. The inner valve casing 4 is fixed to the outer valve casing 3 by engaging the piece 37, which is at the protruding position, with the outer surface of the inner valve casing 4.

As already stated, the enclosed space S defined by the inner packing 6 is formed between the inner surface of the outer valve casing 3 and the outer surface of the inner valve casing 4. Since water does not enter the enclosed space S, the piece 37 can protrude into the enclosed space S. The piece 37 is engaged with the side surface of the inner valve casing 4 below the annular portion 61, and thus, can be used even if the height of the outer valve casing 3 is small. Further, since the communication port 33 in which the piece 37 is incorporated is provided in the outer valve casing 3, it is unnecessary to connect another member for fixing the inner valve casing 4 to the outer valve casing 3. Therefore, the valve device 1 is excellent in usability for fixing the inner valve casing 4 to the outer valve casing 3.

The inner surface of the communication port 33 has a shape that restricts the rotation of the piece 37, and the piece 37 is housed in the communication port 33 in a non-rotatable manner. Therefore, when a bolt member 38*b*, which will be described later, is screwed, co-rotation of the piece 37 can be prevented. In FIG. 6, the piece 37 is disposed at the protruding position, by the operation from the outside through the communication port 33, specifically with the set screw 34*a* as a screw member screwed to the communication port 33. A hexagonal hole (not shown) is formed in the back surface (the surface on the right side in FIG. 6) of the set screw 34*a*. When the set screw 34*a* is screwed, the distal end face of the set screw 34*a* presses the back surface of the piece 37, so that the piece 37 can displace toward the inside of the enclosed space S.

In the present embodiment, an engagement surface 37*f* of the piece 37 to be engaged with the outer surface of the inner valve casing 4 has a flat surface, and thus, the outer surface of the inner valve casing 4 is not damaged by the engagement surface 37*f*. In addition, the engagement surface 37*f* is inclined upward toward the enclosed space S, and a part of the outer surface of the inner valve casing 4 to be in contact with the engagement surface 37*f* has an inclined surface 4*f* inclined in the same direction as the engagement surface 37*f*. Therefore, the piece 37 can be smoothly engaged with the outer surface of the inner valve casing 4. The engagement surface 37*f* and the inclined surface 4*f* are configured to be in surface contact with each other.

Figure 7:
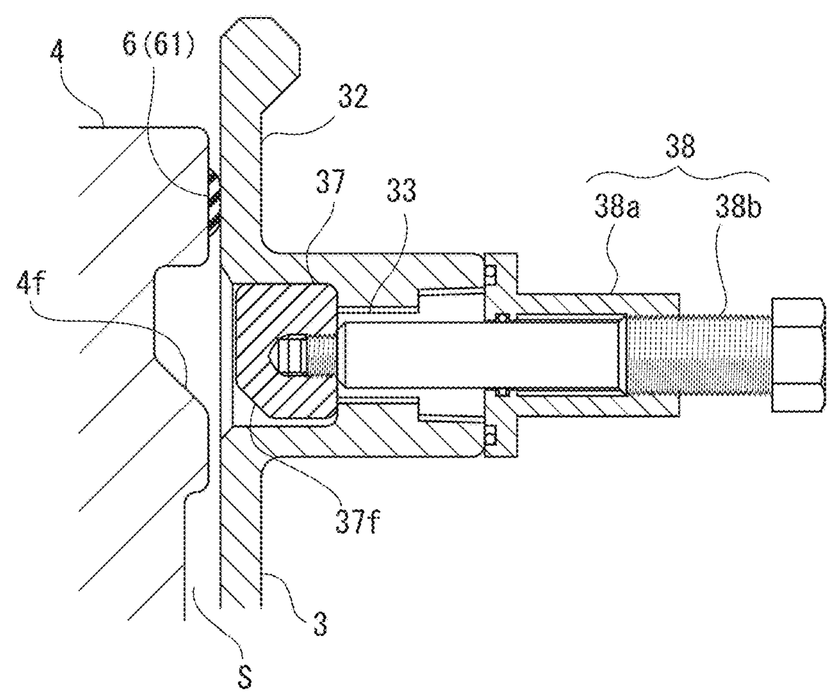
FIG. 7 is a sectional view of a main part of the valve device.

In FIG. 7, the piece 37 is disposed at the housed position, by the operation from the outside through the communication port 33, specifically with a jig 38 attached to the communication port 33 in a sealed state. The jig 38 includes a tubular member 38*a* for sealing the communication port 33 via an O-ring, and the bolt member 38*b* screwed into the tubular member 38*a*. The bolt member 38*b* has a distal end that can be screwed onto the back surface of the piece 37. When the piece 37 is pulled in a direction away from the enclosed space S by using the jig 38, the piece 37 can be held at the housed position.

[Assembly of Valve Device]

An example of a procedure for assembling the valve device 1 with a construction method without interrupting water supply will be described. First, the outer valve casing 3 is externally fitted to the existing water pipe K, and the water pipe K is cut inside the outer valve casing 3 by using a cutting device (not shown) connected to the outer valve casing 3 (cutting step). For example, the outer valve casing 3 is mounted on the upstream side of a specific section of a pipeline of the water pipe K where repair or removal is needed. In the operation for mounting the outer valve casing 3, the upper half member 3A and the lower half member 3B are joined to each other by tightening the fixing tool, and the gap between the split portions 30 is sealed with the outer packings 5 and 5. During this process, the end 7*a* of the branch piping 7 is inserted between the split portions 30 to connect the branch piping 7 to the outer valve casing 3. A plug 81 is attached to the end 7*b* of the branch piping 7 (see FIG. 8).

Figure 8:
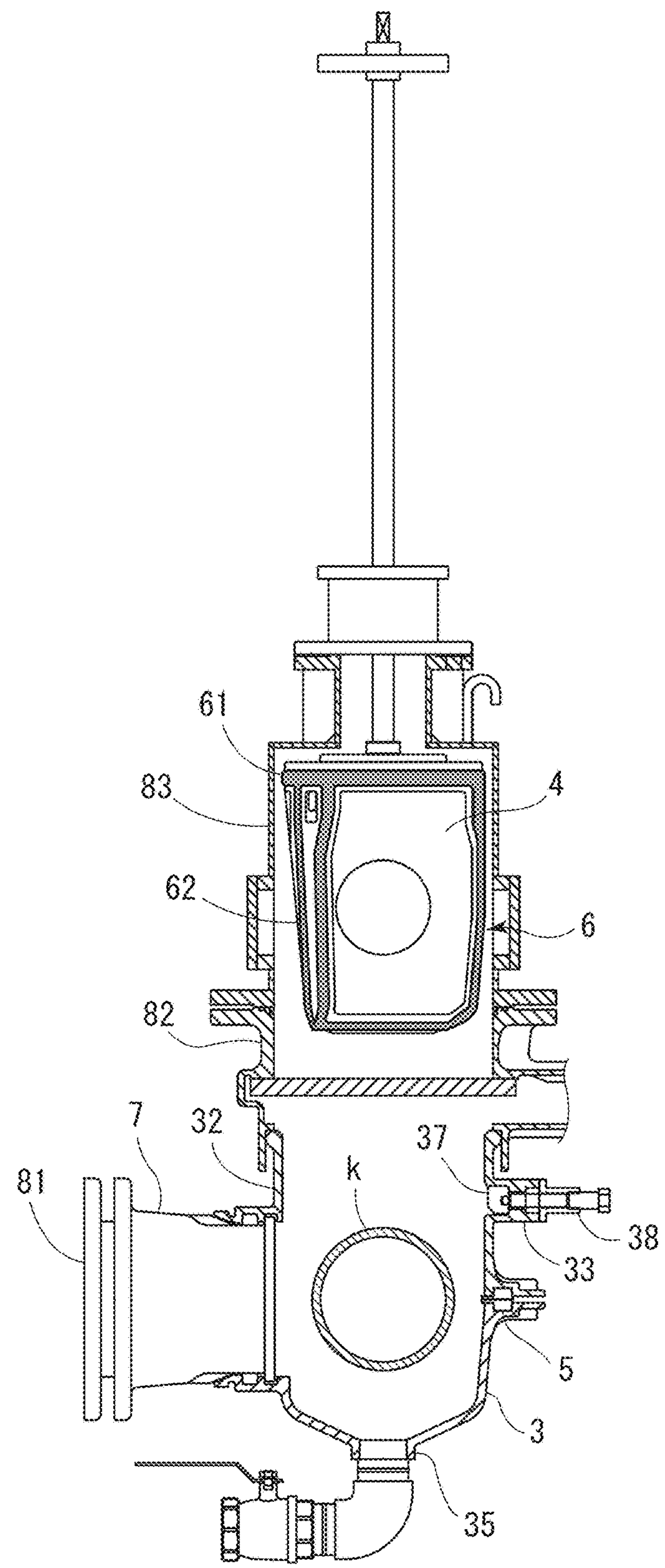
FIG. 8 is a longitudinal sectional view showing a state in which an insertion device is connected to an outer valve casing.

After completing tightening of the fixing tool, the cutting device is connected to the opening 32 of the outer valve casing 3 via a working valve 82 (see FIG. 8). In the cutting operation of the water pipe K, a cutting tool (not shown) such as a hole saw is disposed inside the outer valve casing 3 through the opening 32 with the working valve 82 opened, and the water pipe K is cut without interrupting water supply. In the present embodiment, full cutting step is adopted in which the water pipe K is axially separated as shown in FIG. 1 by using a cutting tool (for example, a hole saw) having a larger diameter than the water pipe K. However, the present invention is not limited thereto. Chips produced by cutting can be discharged to the outside by opening the drain 35. When the cutting is completed, the cutting tool is pulled up and the working valve 82 is closed.

In the cutting step, it is preferable that the piece 37 is housed in the communication port 33 so as not to protrude into the enclosed space S by using the jig 38 attached in a sealed state to the communication port 33, as shown in FIG. 7. This makes it possible to prevent water leakage from the communication port 33 without causing the piece 37 to interfere with (the cutting tool of) the cutting device and without dropping the piece 37 inside the outer valve casing 3 in the cutting step. On the contrary, in the structure in which the inner valve casing is fixed with the tip of the bolt as disclosed in Patent Document 2 filed by the present applicant, a sealing material such as a sealing tape is used for the bolt, and such sealing material may be left in the outer valve casing 3 without being removed.

Next, in place of the cutting device, the insertion device 83 is connected to the outer valve casing 3, and the inner valve casing 4 is inserted into the outer valve casing 3 by using the insertion device 83 as shown in FIG. 8 (insertion step). In the operation for inserting the inner valve casing 4, the working valve 82 which is in the position shown in FIG. 8 is opened, and the shaft of the insertion device 83 is pushed to move down the inner valve casing 4 until the bottom surface of the inner valve casing 4 abuts against the inner surface of the bottom of the outer valve casing 3. At this stage, the valve body 2 and the valve shaft 21 are already attached to the inner valve casing 4, and the inner packing 6 is already mounted on the outer surface of the inner valve casing 4. When the inner valve casing 4 is inserted into the outer valve casing 3, the annular portion 61 seals the opening 32, and the three U-shaped portions 62 seal the peripheries of the through holes 41 to 43, respectively. As a result, the gap between the outer valve casing 3 and the inner valve casing 4 is sealed by the inner packing 6 (see FIGS. 1 and 2).

In the insertion step, the inner packing 6 attached to the inner valve casing 4 seals the gap between the outer valve casing 3 and the inner valve casing 4 as described above, and the enclosed space S defined by the inner packing 6 is formed between the inner surface of the outer valve casing 3 and the outer surface of the inner valve casing 4. When the inner valve casing 4 moves downward, the inner packing 6 comes into contact with the inner surface of the outer valve casing 3. However, since the inner packing 6 can be prevented from being detached due to the connecting portion 63, the enclosed space S is appropriately formed. Further, in the insertion step, the piece 37 is housed in the communication port 33 so as not to protrude into the enclosed space S by the operation from the outside through the communication port 33 as shown in FIG. 7. This makes it possible to prevent the piece 37 from interfering with the inner valve casing 4.

Even if the sealing performance between the outer valve casing 3 and the inner valve casing 4 is appropriately exhibited, water is accumulated in the enclosed space S immediately after the insertion step. Therefore, the drain 35 is opened to discharge water in the enclosed space S. If water is not continuously discharged from the drain 35, it can be checked that the sealing performance between the outer valve casing 3 and the inner valve casing 4, in particular, the sealing performance due to the U-shaped portions 62, is appropriately exhibited. If water is not continuously discharged even if the drain (not shown) of the insertion device 83 is opened, it can be checked that the sealing performance between the outer valve casing 3 and the inner valve casing 4, particularly the sealing performance due to the annular portion 61, is appropriately exhibited. After the sealing performance is checked, the jig 38 is removed from the communication port 33.

Next, the inner valve casing 4 is fixed to the outer valve casing 3 (fixing step). In this fixing step, by an operation from the outside through the communication port 33, the piece 37 is projected into the enclosed space S and engaged with the outer surface of the inner valve casing 4, as shown in FIG. 6. Thus, the inner valve casing 4 is fixed to the outer valve casing 3. The inner valve casing 4 can be finally fixed to the outer valve casing 3 by the lid 36 as shown in FIG. 2. Therefore, fixing using the piece 37 may be temporary (that is, may be tentative). In the present embodiment, the set screw 34*a* is screwed into the communication port 33, so that the piece 37 protrudes into the enclosed space S. From the viewpoint of protecting the screw thread of the set screw 34*a*, the communication port 33 may be closed with the plug 34*b*, if necessary.

After the inner valve casing 4 is fixed to the outer valve casing 3, the working valve 82 and the insertion device 83 are removed from the outer valve casing 3. Then, as shown in FIG. 2, the speed reducer 22 is placed on the inner valve casing 4, and the lid 36 is connected to the outer valve casing 3 and closed so that the inner valve casing 4 is housed in the outer valve casing 3. According to the valve device 1 described above, it is possible to shut off the flow path for repair or removal in a specific area or switch the flow path to the branch pipe connected to the branch piping 7. In case of removing the inner valve casing 4 for some reason, the inner valve casing 4 may be released from the outer valve casing 3 by the procedure reverse to the above procedure.

Other Embodiments

The above-described embodiment shows an example in which the valve device is configured as a switching valve (three-way switching valve) that can switch the flow path by a rotary valve body. However, the present invention is not limited thereto. For example, the valve device may be configured as a gate valve that can shut off the flow path by a valve body which is vertically movable as disclosed in Patent Document 2 filed by the present applicant.

The above embodiment shows an example where the inner packing has three U-shaped portions. However, the present invention is not limited thereto. For example, when the valve device is configured as a gate valve as described above, the inner packing may have two U-shaped portions arranged to surround a pair of through holes. The number of U-shaped portions of the inner packing is, for example, two to four.

Figure 9:
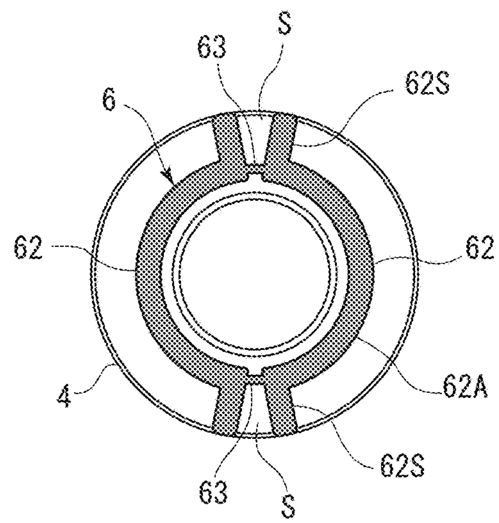
FIG. 9 is a bottom view of an inner valve casing according to another embodiment of the present invention.
Figure 9:
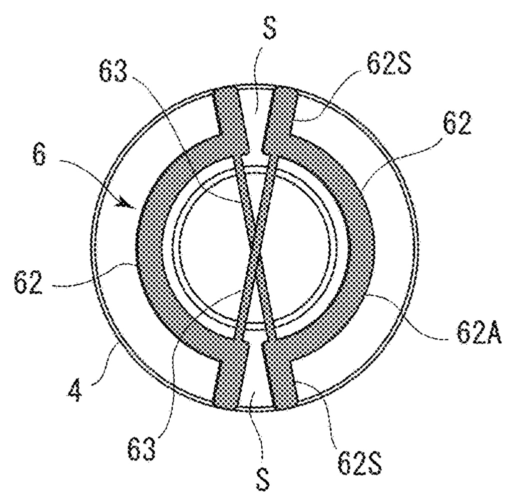
Figure 9:
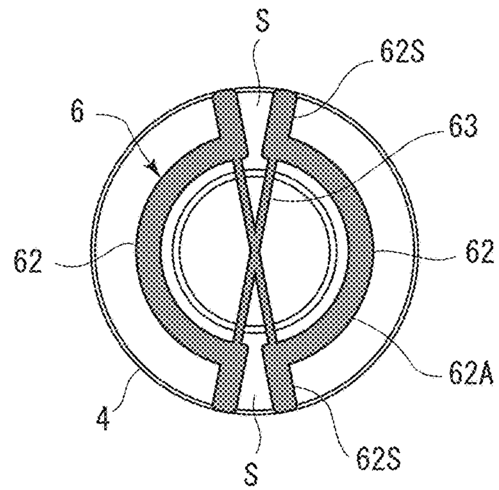
Figure 10:
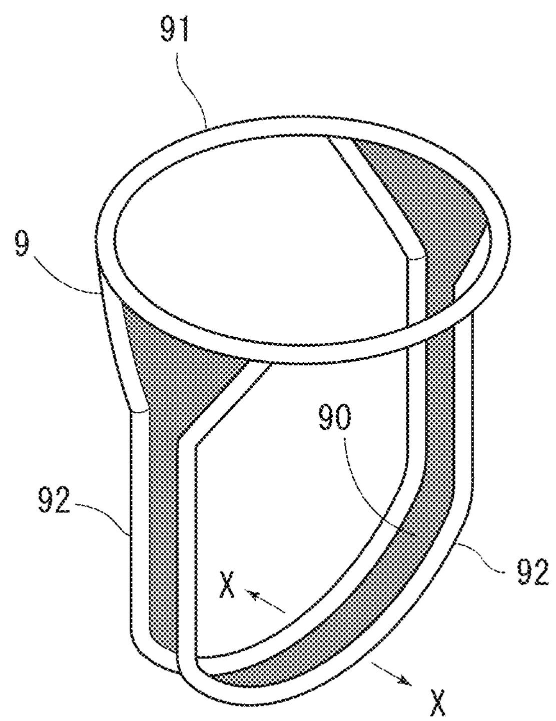
FIG. 10 is a perspective view of an inner packing included in a valve device disclosed in Patent Document 2.

FIGS. 9(*a*) to 9(*c*) are bottom views of an inner valve casing 4 according to another embodiment, wherein an inner packing 6 having two U-shaped portions 62 is mounted. FIG. 9 (*a*) shows an example in which a connecting portion 63 is provided along a direction of extension of an arcuate part 62A. FIG. 9 (*b*) shows an example in which the connecting portions 63 are provided along a direction of extension of linear parts 62S. The two connecting portions 63 and 63 intersect each other, and they may be bonded at a point of intersection as necessary. FIG. 9 (*c*) shows an example in which the connecting portion 63 is provided along a direction of extension of linear parts 62S, the connecting portion 63 being formed into an X shape. These modifications are also applicable to the above-described embodiment.

While the valve device according to the present invention is applicable to a water pipe, it is not limited thereto, and it can be widely applied to a fluid pipe used for various fluids, such as liquids or gases, other than water.

The present invention is not limited to the embodiment mentioned above, but can be improved and modified variously within the scope of the present invention.

What is claimed is:

1. A valve device comprising:
- an outer valve casing externally fitted to an existing fluid pipe;
- an inner valve casing housed in the outer valve casing and having a valve body capable of shutting off or switching a flow path of a fluid flowing in the existing fluid pipe; and
- an inner packing arranged to seal a gap between the outer valve casing and the inner valve casing, wherein
- the inner packing includes an annular portion mounted along a periphery of an upper side surface of the inner valve casing and a plurality of U-shaped portions extending downward from the annular portion and to be mounted over an entire length from a side surface to a bottom surface of the inner valve casing, and each U-shaped portion contacts the side surface and the bottom surface of the inner valve casing,
- an enclosed space sandwiched between an inner surface of the outer valve casing and an outer surface of the inner valve casing is formed between the U-shaped portions that are adjacent to each other,
- the inner packing is provided with a connecting portion for connecting the plurality of U-shaped portions to one another, and
- the connecting portion is formed to be thinner than the U-shaped portions.

2. The valve device according to claim 1, wherein the connecting portion is disposed on a bottom surface of the inner valve casing.

3. The valve device according to claim 2, wherein
- each of the U-shaped portions includes an arcuate part and a pair of linear parts extending from both ends of the arcuate part toward the side surface of the inner valve casing as viewed from the bottom surface side of the inner valve casing, and
- the connecting portion is provided along a direction of extension of the arcuate part or along a direction of extension of the linear parts.

4. The valve device according to claim 1, wherein the outer valve casing has a communication port for allowing the enclosed space to communicate with an outside and an opening/closing member for opening and closing the communication port.

5. A valve device comprising:
- an outer valve casing externally fitted to an existing fluid pipe;
- an inner valve casing housed in the outer valve casing and having a valve body capable of shutting off or switching a flow path of a fluid flowing in the existing fluid pipe; and
- an inner packing arranged to seal a gap between the outer valve casing and the inner valve casing, wherein
- the inner packing includes an annular portion mounted along a periphery of an upper side surface of the inner valve casing and a plurality of U-shaped portions extending downward from the annular portion and to be mounted over an entire length from a side surface to a bottom surface of the inner valve casing, and each U-shaped portion contacts the side surface and the bottom surface of the inner valve casing,
- an enclosed space sandwiched between an inner surface of the outer valve casing and an outer surface of the inner valve casing is formed between the U-shaped portions that are adjacent to each other, and
- the inner packing is provided with a connecting portion for connecting the plurality of U-shaped portions to one another
- wherein the enclosed space extends vertically at a plurality of positions on the side surface of the inner valve casing so as to communicate with one another on the bottom surface side of the inner valve casing.

6. The valve device according to claim 5, wherein the connecting portion is disposed on a bottom surface of the inner valve casing.

7. The valve device according to claim 6, wherein
- each of the U-shaped portions includes an arcuate part and a pair of linear parts extending from both ends of the arcuate part toward the side surface of the inner valve casing as viewed from the bottom surface side of the inner valve casing, and the connecting portion is provided along a direction of extension of the arcuate part or along a direction of extension of the linear parts.

8. The valve device according to claim 5, wherein the outer valve casing has a communication port for allowing the enclosed space to communicate with an outside and an opening/closing member for opening and closing the communication port.

* * * * *